United States Patent
Brown et al.

(10) Patent No.: US 6,973,663 B1
(45) Date of Patent: Dec. 6, 2005

(54) METHOD AND APPARATUS FOR DETECTING AND VIEWING SIMILAR PROGRAMS WITHIN A VIDEO SYSTEM

(75) Inventors: Jeffrey A. Brown, Roseville, MN (US); Philip E. Hsiao, Eden Prairie, MN (US); Craig A. Finseth, St. Paul, MN (US)

(73) Assignee: The DIRECTV Group, Inc., El Segundo, CA (US)

( * ) Notice: Subject to any disclaimer, the term of this patent is extended or adjusted under 35 U.S.C. 154(b) by 0 days.

(21) Appl. No.: 09/536,074

(22) Filed: Mar. 24, 2000

Related U.S. Application Data

(60) Provisional application No. 60/126,913, filed on Mar. 29, 1999.

(51) Int. Cl.$^7$ .............................. G06F 3/00; H04N 7/16
(52) U.S. Cl. .......................... 725/39; 725/49; 725/145; 725/146
(58) Field of Search ................................. 725/9, 37, 39, 725/40, 42, 43, 54, 145, 146, 49

(56) References Cited

U.S. PATENT DOCUMENTS

| | | | | |
|---|---|---|---|---|
| 6,025,837 A | * | 2/2000 | Matthews et al. | 345/721 |
| 6,088,722 A | * | 7/2000 | Herz et al. | 709/217 |
| 6,133,909 A | * | 10/2000 | Schein et al. | 345/721 |
| 6,240,555 B1 | * | 5/2001 | Shoff et al. | 725/110 |
| 6,286,141 B1 | * | 9/2001 | Browne et al. | 725/39 |
| 6,317,883 B2 | * | 11/2001 | Marics | 725/56 |
| 6,367,078 B1 | * | 4/2002 | Lasky | 725/52 |
| 6,483,548 B1 | * | 11/2002 | Allport | 348/564 |

* cited by examiner

*Primary Examiner*—Kieu-Oanh Bui
(74) *Attorney, Agent, or Firm*—Georgann S. Grunebach

(57) ABSTRACT

A device that detects and displays similar programs within a video system includes a memory, a display and a receiver that receives an input stream of television program content and electronic program guide data, wherein. the program guide data includes a plurality of attributes characterizing television programs within the television program content. The receiver separates electronic program guide data from the input stream while the memory stores the electronic program guide data separated from the input stream. Upon receiving a first user request, a controller compares a first set of attributes relating to at least one television program within the television content with second sets of attributes relating to further television programs within the television program content to determine a correlation between the first television program and each of the further television programs. In this manner, the controller identifies the television programs that have attributes that are similar to the attributes of the first television program based on the correlation and displays indications of the television programs found to be similar.

24 Claims, 11 Drawing Sheets

After selecting the "?" for "48 HOURS"

Most of your remembered programs contain the category "News".

FIG. 11

Some of your remembered programs contain the category "Comedies".

FIG. 12

«METHOD AND APPARATUS FOR DETECTING AND VIEWING SIMILAR PROGRAMS WITHIN A VIDEO SYSTEM»

CROSS-REFERENCE TO RELATED APPLICATION(S)

This application claims priority from U.S. Provisional Application No. 60/126,913, filed Mar. 29, 1999 entitled "Method And Apparatus For Viewing Similarity Matching Explanations."

FIELD OF THE INVENTION

The present invention relates to the presentation of electronic program guide information to a viewer and, more particularly, to a method and apparatus for detecting and viewing similar programs within a video system.

BACKGROUND ART

Television programs are distributed to viewers by a variety of broadcasting methods. These methods include traditional analog broadcast television (National Television Systems committee or "NTSC" standard), the upcoming digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

Channel numbers are typically used to identify the stream of television content offered by a content provider. Program guide information is typically transmitted along with the television content. The program guide information includes a set of channel definition parameters that define which portions of the transmitted television content are associated with the various channels, and also typically includes schedule information for display on users' televisions. The schedule information informs users what television programs are currently on, and what television programs will be shown in the near future.

While it is possible to classify programs being televised and present the user with schedule information which matches the users' preferences in television programs, the user does not always know or have the opportunity to view the classification criteria used to clarify the presented schedule information.

BRIEF SUMMARY OF THE INVENTION

A device or method for detecting and viewing similar programs within a video system includes a receiver having a tuner that receives an input stream of television program content and electronic program guide data, a memory and a display. The receiver separates electronic program guide data from the input stream while the memory stores the electronic program guide data separated from the input stream. The program guide data includes a plurality of attributes characterizing television programs within the television program content. Upon receiving a first user request, a controller compares a first set of attributes relating to at least one television program within the television content with different second sets of attributes relating to other television programs within the television content to determine a correlation between the two sets of attributes. The controller then identifies the television programs that have attributes which are similar to the attributes of the first television program based on the correlation and displays indications of the television programs found to be similar.

In accordance with one aspect of the invention, a program similarity detecting device includes a receiver adapted to receive an input stream of television program content and electronic program guide data, and adapted to separate the electronic program guide data from the input stream. Preferably, the program guide data includes a plurality of attributes characterizing television programs within the television program content. The program similarity detecting device further includes a memory coupled to the receiver that is adapted to store the electronic program guide data, a controller coupled to the memory and a display coupled to the controller.

In this embodiment, the controller is programmed to compare a first set of attributes relating to at least one television program within the television program content to a second set of attributes relating to a second television program within the television program content to determine a correlation between the first set of attributes and the second set of attributes. Additionally, the controller is programmed to determine whether the second television program is a similar to the first television program based on the correlation between the first set of attributes and the second set of attributes. The controller is also programmed to cause the display to generate a first display indicating the second television program if the second television program is determined to be similar to the first television program. The controller may also be programmed to cause the display to generate a second display including an explanation describing the correlation between the first set of attributes and the second set of attributes.

In accordance with another aspect of the invention, a method of identifying similar programs within a video reception system includes storing first characterizing information associated with a first television program, receiving further characterizing information associated with each of a set of second television programs and performing a similarity comparison between the first characterizing information and each of the further characterizing information to determine a third set of television programs. The third set of television programs includes the television programs within the second set of television programs having further characterizing information that matches the first characterizing information to a specific degree. The method of identifying similar programs within a video reception system additionally includes displaying indications of the third set of television programs. Moreover, the method may include displaying an explanation of the results of the similarity comparison and displaying an attribute associated with the further characterizing information that matches an attribute associated with the first characterizing information.

In accordance with yet another aspect of the invention, a method of displaying program similarity explanations includes transmitting program guide data, receiving the program guide data, storing the program guide data in a memory, identifying a first set of television programs and storing characterizing information for the first set of television programs. The method then correlates the characterizing information of the first set of television programs with characterizing information of a second set television programs and displays an indication of the television programs within the second set of television programs that are correlated to a predetermined degree with the first set of television programs. Moreover, the method may display an explanation of the correlation between the first set of television programs and at least one of the television programs within the second set of television programs that is correlated to a predetermined degree with the first set of television programs.

BRIEF DESCRIPTION OF THE DRAWINGS

FIG. 11 is an embodiment of a display of an explanation for a similarity matched television program; and FIG. 12 is an embodiment of a display of an explanation for a similarity matched television program.

DETAILED DESCRIPTION

I. Transmission of Television Content, Program Guide Data and Advertising Data

Figure 1:
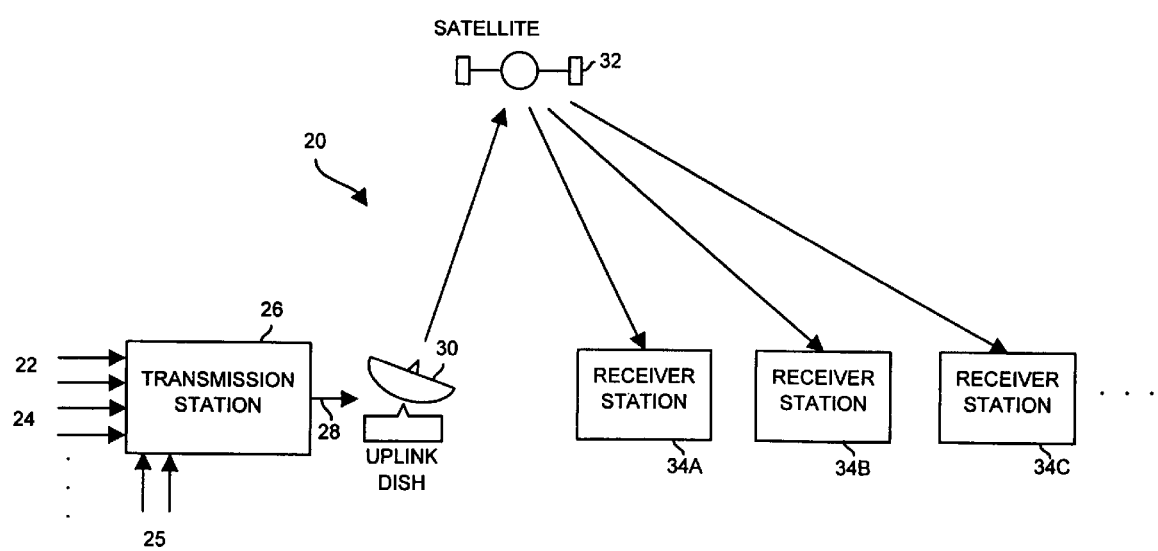
FIG. 1 is a block diagram of a preferred embodiment of a television broadcasting system for the transmission, receipt and display of television content and electronic program guide data.

FIG. 1 is a block diagram of television broadcasting system 20, which transmits and receives audio, video and data signals via satellite. Although the present invention is described in the context of a satellite-based television broadcasting system, the techniques described herein are equally applicable to other methods of television content delivery, such as over-the-air systems and cable-based systems.

Television broadcasting system 20 includes transmission station 26, uplink dish 30, satellite 32 and one or more receiver stations 34A–34C (collectively referred to as receiver stations 34). The transmission station 26 includes a plurality of input lines 22 for receiving various signals, such as analog television signals, digital television signals, video tape signals, original programming signals, and computer generated signals containing HTML content and digital video server signals. Each input line 22 typically corresponds to a single television channel. Transmission station 26 also includes a plurality of schedule feeds 24 and advertising feeds 25. Schedule feeds 24 provide electronic schedule information about the timing and content of various television channels, such as that found in television schedules contained in newspapers and television guides. The electronic schedule information from the schedule feeds 24 is converted into program guide data by the transmission station 26.

The transmission station 26 receives and processes the various input signals received on input lines 22 and schedule feeds 24, converts the received signals into a standard form, combines the standard signals into a single output data stream 28, and continuously sends output data stream 28 to uplink dish 30. The output data stream 28 is preferably a modulated signal, which is modulated by the transmission station 26 using standard frequency and polarization modulation techniques. In a preferred embodiment, the output data stream 28 is a multiplexed signal including 16 frequency bands. The transmission station 26 is described in further detail below with respect to FIG. 2.

The uplink dish 30 continuously receives the output data stream 28 from the transmission station 26, amplifies the received signal and transmits the signal to a satellite 32. Although a single uplink dish and satellite are shown in FIG. 2, multiple dishes and satellites are preferably used to provide additional bandwidth, and to help ensure continuous delivery of signals.

The satellite 32 revolves in geosynchronous orbit about the earth. The satellite 32 includes a plurality of transponders that receive signals transmitted by the uplink dish 30, amplify the received signals, frequency shift the received signals to higher frequency bands, and then transmit the amplified, frequency shifted signals back to receiver stations 34. A total of 32 transponders are preferably used in the present invention.

Receiver stations 34 receive and process the signals transmitted by the satellite 32. The receiver stations 34 include hardware and software for separating the electronic program guide data from the received signals, and processing the electronic program guide data. The receiver stations 34 are described in further detail below with respect to FIG. 4.

Figure 2:
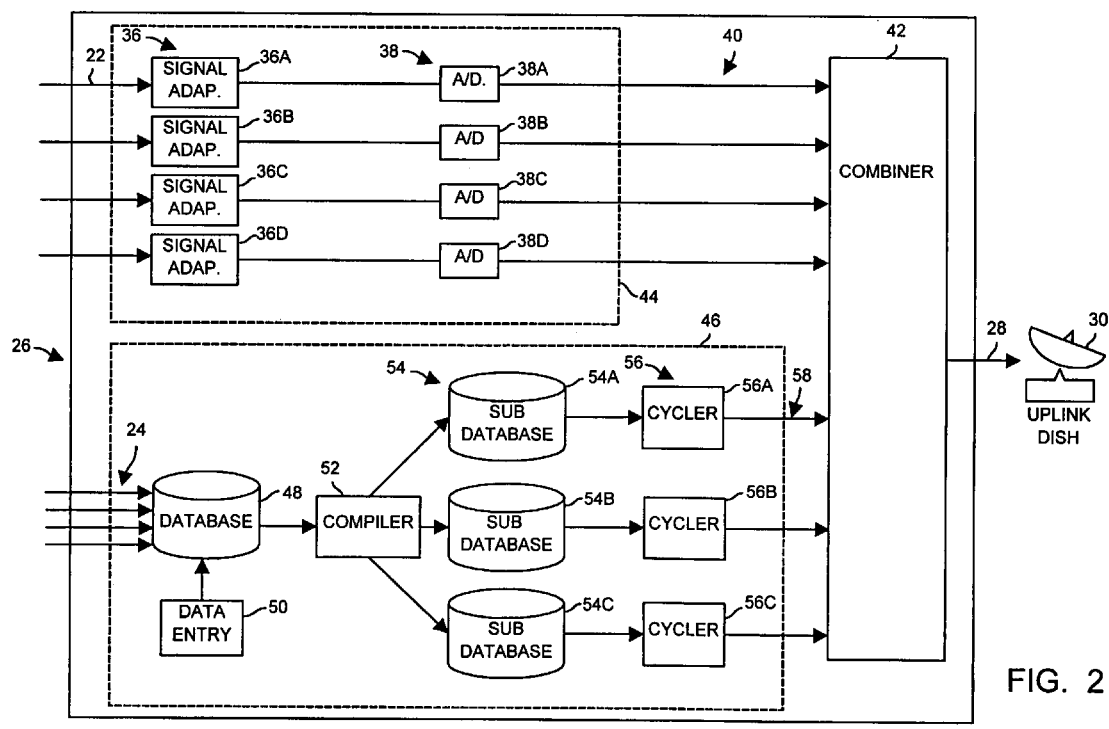
FIG. 2 is a block diagram of the transmission station of the system shown in FIG. 1.

FIG. 2 is a block diagram of the transmission station 26. The transmission station 26 includes program transmitting system 44 and program guide transmitting system 46. The program transmitting system 44 includes input signal adapters 36A–36D (collectively referred to as input signal adapters 36), analog to digital (A/D) converters 38A–38D (collectively referred to as A/D converters 38), and a combiner 42. The input signal adapters 36 are coupled to the A/D converters 38, and the A/D converters 38 are coupled to the combiner 42. Although four input signal adapters 36 and four A/D converters 38 are shown in FIG. 2, several more will typically be used in commercial systems.

The input signal adapters 36 receive input signals from the input lines 22, and convert the input signals to a standard form. As mentioned above, signals from the input lines 22 may include analog televison signals, digital television signals, video tape signals, original programming signals, computer generated signals containing HTML content, digital video server signals as well as amu others desired signals. Also, the input lines 22 can receive signals from digital video servers having hard discs or other digital storage media. The input signal adapters 36 preferably convert the input signals to a high quality analog format. The high quality analog signals are output by the input signal adapters 36 to the A/D converters 38. The A/D converters 38 convert the analog signals received from the input signal adapters 36 to digital signals, and compress the digital signals using MPEG2 encoding, although other compression schemes may be used.

During the MPEG2 encoding step, the A/D converters 38 also perform a statistical multiplexing operation. During the statistical multiplexing operation, the A/D converters 38 determine the amount of bandwidth that each channel will use. The amount of bandwidth allowed for each channel is determined based upon the content of the signal on that channel, and the amount of bandwidth used by other channels. For a program such as the motion picture "Independence Day," which has a very dynamic picture content with a great deal of movement and numerous bright explosions, the signal cannot be compressed as much as a more static video signal like an information channel. The greater the dynamic content of the signal, the less the signal can be compressed and the greater the bandwidth required.

Typically, 30 Mega bits of data per second are transmitted by the uplink dish 30 for each transponder in the satellite 32. Each transponder receives and transmits data for about 6 channels. Thus, on average each channel occupies approximately 5 Mega bits of data per second. During the statistical multiplexing operation, the amount of compression for each channel, and correspondingly the amount of information transmitted for each channel, is adjusted up or down depending upon the amount of available space for each transponder. The combiner 42 feeds back information to the A/D converters 38 during the statistical multiplexing operation, informing the A/D converters 38 of the amount of bandwidth used by various channels. The A/D converters 38 then adjust the amount of compression of a signal based on the information fed back from the combiner 42.

The MPEG2 encoded digital data are output by the A/D converters 38 to the combiner 42. The combiner 42 groups the MPEG2 encoded digital data from each A/D converter 38 into a plurality of packets, with each such packet marked with a service channel identification (SCID) number. The SCIDs are later used by the receiver 64 (shown in FIG. 3) to identify the packets that correspond to each television channel. The combiner 42 combines all of the packets for all of the channels, adds error correction data, and outputs a single output data stream 28 to the uplink dish 30.

The program transmitting system 44 processes audio signals in the same manner as video signals, and the combiner 42 combines digital audio signals with the digital video signals very any known or desired technique. The combiner 42 also receives electronic program guide data from the input lines 58 (as described below with respect to the program guide transmitting system 46) and adds that data to the output data stream 28. The assembly and processing of the electronic program guide data prior to it being sent to the combiner 42 is described in more detail below.

The output data stream 28, which is output by the combiner 42, is a multiplexed signal that is modulated by the combiner 42 using standard frequency and polarization modulation techniques. The output data stream 28 preferably includes 16 frequency bands, with each frequency band being either left polarized or right polarized. Because there are 32 transponders in the preferred embodiment, each of the 16 frequency bands are shared by two transponders. Therefore, transponder one is assigned frequency one, left polarization; transponder two is assigned frequency one, right polarization; transponder three is assigned frequency two, left polarization, etc.

Also shown in FIG. 2 is a block diagram of the program guide transmitting system 46, which is a part of the transmission station 26. The program guide data transmitting system 46 includes a database 48, a compiler 52, sub-databases 54A–54C (collectively referred to as sub-databases 54) and cyclers 56A–56C (collectively referred to as cyclers 56).

The schedule feeds 24 provide electronic schedule information about the timing and content of various television channels, such as that found in television schedules contained in newspapers and televison guides. The schedule feeds 24 may also provide HTML content.

The database 48 is a computer-based system that receives data from the schedule feeds 24 and organizes that data into a standard format. Program guide data and HTML data may also be manually entered into the program guide database 48 through the data entry station 50. HTML data can be created with commercially available applications, including Claris software, Microsoft software and Adobe software. The compiler 52 reads the standard form data out of the database 48, converts the data into the proper format for transmission to users (specifically, the data is converted into program guide and HTML objects as discussed below) and outputs the data to one or more of the sub-databases 54. The compiler 52 includes a filter program for HTML data that makes sure that only, for example, the subset of HTML version 4.0 that is defined in receiver 64 (shown in FIG. 3) is used. The preferred subset of HTML version 4.0 defined in the receivers is discussed below. Alternatively, the receiver 64 may be programmed to process the complete specification of HTML version 4.0, and no filter would be required.

The program guide and HTML objects are temporarily stored in the sub-databases 54 until the cyclers 56 request the information. Each of the cyclers 56 preferably transmits objects to the combiner 42 at a different rate than the other cyclers 56. For example, the cycler 56A may transmit objects to the combiner 42 every second, while the cyclers 56B and 56C may transmit objects every 5 seconds and every 10 seconds, respectively.

Because the receiver 64 (shown in FIG. 3) may not always be on and receiving and saving objects, the objects must be continuously re-transmitted. Preferably program guide objects for programs that will be shown in the next couple of hours are sent more frequently than program guide objects for programs that will be shown in 12 hours or more. Thus, the program guide objects for the most current programs are sent to the cycler 56 with a high rate of transmission, while program guide objects for later programs are sent to cyclers 56 with a lower rate of transmission.

All of the objects output by the plurality of the cyclers 92 are combined by the combiner 42. The combiner 42 combines the objects with the digital video and audio data output by the A/D converters 38 on output lines 40 and transmits output data stream 28, which includes the program guide data, HTML data and the digital video and audio data, to the uplink dish 30.

II. Format of Transmitted Program Guide and Advertising Data

Prior to transmitting data to the sub-databases 54, the compiler 52 organizes the program guide data from the database 48 into objects. Each object preferably includes an object header and an object body. The object header identifies the object type, object ID, version number of the object and characterizing information. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television, and is also used for channel definition parameters.

Prior to transmission, each object is preferably broken down by the compiler 52 into multiple frames. Each frame is made up of a plurality of 126 byte packets. Each frame includes a frame header, program guide data and a checksum. Each frame header includes the same information as the object header described above—object type, object ID and version number. The frame header uniquely identifies the frame, and its position within a group of frames that make up an object. The checksum is examined by receiver 64 to verify the accuracy of the data within received frames.

The system described herein may use over 15 different object types. The objects that are used for providing channel definition parameters include boot objects, charmer list objects, channel objects and conditional objects. Other objects, such as HTML (Hyper Text Markup Language) objects, are used to provide channel content. Still further objects, such as program objects, general schedule objects and master schedule objects are used by receiver 64 to generate a display of a program guide on a user's television.

A boot object identifies the SCIDs where all other objects can be found. A boot object is always transmitted on the same channel, which means that each packet of data that makes up a boot object is marked with the same SCID number. Boot objects are transmitted frequently to ensure that receivers 64 that have been shut off, and are then turned back on, immediately receive information indicating the location of the various program guide objects. Thus, boot objects are sent from the compiler 52 to a cycler 56 with a high rate of transmission.

III. Receiving and Processing Program Guide Data

Figure 3:
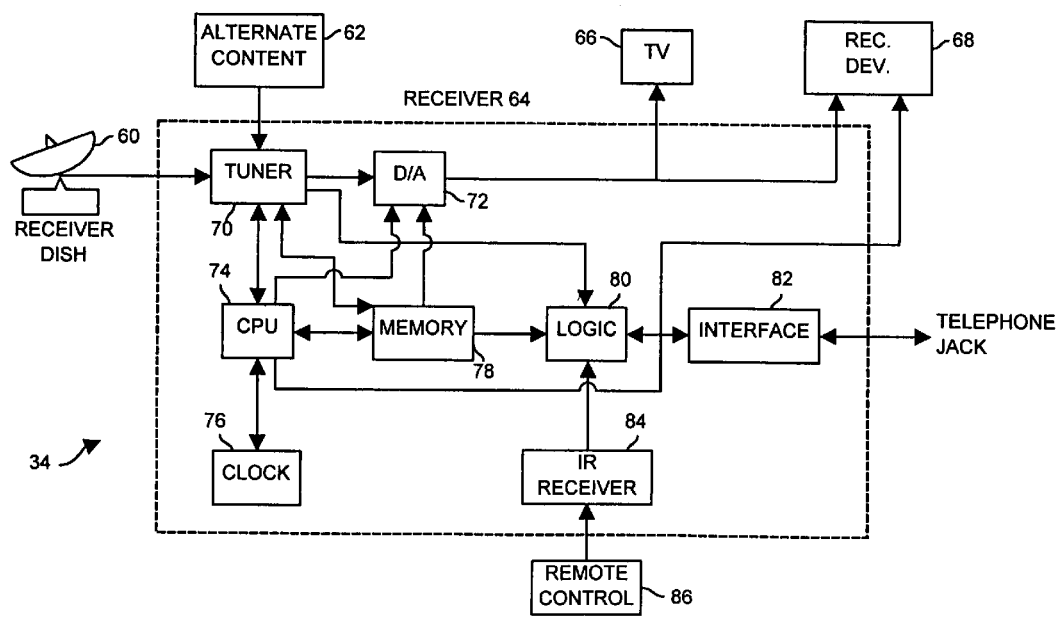
FIG. 3 is a block diagram of a receiver station for receiving and decoding audio, video and data signals.

FIG. 3 is a block diagram of one of receiver stations 34, which receives and decodes audio, video and data signals. The receiver station 34 includes a receiver dish 60, an alternate content source 62, a receiver 64, a television 66, a recording device 68 and a remote control 86. The receiver 64 includes a tuner 70, digital-to-analog (D/A) converter 72, a CPU 74, a clock 76, a memory 78, a logic circuit 80, an interface 82, and an infrared (IR) receiver 84.

The receiver dish 60 receives signals sent by the satellite 32, amplifies the received signals and passes the signals on to the tuner 70. The tuner 70 operates under control of the CPU 74. The tuner 70 is preferably two separate tuners, a first tuner for tuning to digital DSS and ATSC channels, and a second tuner for tuning to analog NTSC channels. The functions performed by the CPU 74 are controlled by a control program stored in the memory 78. The memory 78 also stores a parameter table, which includes a variety of parameters for the receiver 64 such as a list of channels the receiver 64 is authorized to process and generate displays for, the zip code and area code for the area in which receiver 64 is used, and the model number of the receiver 64. The clock 76 provides the current local time to the CPU 74. The interface 82 is preferably coupled to a telephone jack at the site of the receiver station 34. The interface 82 allows the receiver 64 to communicate with the transmission station 26 via telephone lines. The interface 82 may also be used to transfer data to and from a network, such as the Internet.

The signals sent from the receiver dish 60 to the tuner 70 are digital signals that are grouped into a plurality of packets. Each packet includes a header that identifies the SCID number for the packet, and the type of data contained in the packet (e.g, audio data, video data, or program guide data). The tuner 70 includes multiple output lines for transmitting video data, audio data, and program guide data. As packets are received from the receiver dish 60, the tuner 70 identifies the type of each packet and outputs each packet on the appropriate output line, as discussed in more detail below. If the tuner 70 identifies a packet as program guide data, the tuner 70 outputs the packet to the memory 78. Program guide data is stored in a guide database in the memory 78.

In addition to the digital satellite signals received by the receiver dish 60, other sources of television content are also preferably used. For example, the alternate content source 62 provides additional television content to the television 66. The alternate content source 62 is coupled to the tuner 70 and can be an antenna for receiving off-the-air signals NTSC signals, a cable for receiving ATSC signals, or any other content source. Although only one alternate content source 62 is shown, multiple sources can be used.

Initially, as data enters the receiver 64, the tuner 70 looks for a boot object. Boot objects are always transmitted with the same SCID, so the tuner 70 knows that it must look for packets marked with that SCID. A boot object identifies the SCIDs where all other objects can be found. The information from the boot object is used by the tuner 70 to identify packets of advertising data and program guide data and to route these packets to the memory 78.

As program guide data and advertising data are received and stored in the database within the memory 78, the CPU 74 performs various operations on the data in preparation for displaying a program guide on the television 66. These operations include packet assembly, object assembly and object processing.

The first operation performed on the program guide data stored in the guide database in the memory 78 is packet assembly. During the packet assembly operation, the CPU 74 examines the stored program guide data and determines the locations of the packet boundaries.

The next step performed by the CPU 74 is object assembly. During the object assembly step, the CPU 74 combines packets to create object frames, and then combines the object frames to create program guide objects. The CPU 74 examines the checksum transmitted within each object frame, and verifies whether the frame data was accurately received. If the object frame was not accurately received, it is discarded from the memory 78. Also during the object assembly step, the receiver 64 discards assembled objects that are of an object type that the receiver 64 does not recognize. The receiver 64 maintains a list of known object types in the memory 78. The CPU 74 examines the object header of each received object to determine the object type. The CPU 74 compares the object type of each received object to the list of known object types stored in the memory 78. If the object type of an object is not found in the list of known object types, the object is discarded from the memory 78.

The last step performed by the CPU 74 on received program guide is object processing. During the object processing step, the objects stored in the database are combined to create a digital image of a program guide. The digital image of the program guide is later converted to an analog signal that is sent to the television 66 for display to a user.

IV. Processing Channel Objects

Users select a particular channel to watch on the television 66 using the remote control 86. The remote control 86 emits infrared signals that are received by the infrared (IR) receiver 84 in the receiver 64. Other types of data entry devices may be alternatively be used, such as an ultra-high frequency (UHF) remote control, a keypad on the receiver 64, a remote keyboard and a remote mouse, etc. channels are preferably selected using the remote control 86 to navigate around an electronic television program guide, such as the program guide 88 shown in FIG. 4, which is generated by the receiver 64 and displayed on the television 66. Channels may also be selected by entering a channel number with the remote control 86.

Figure 4:
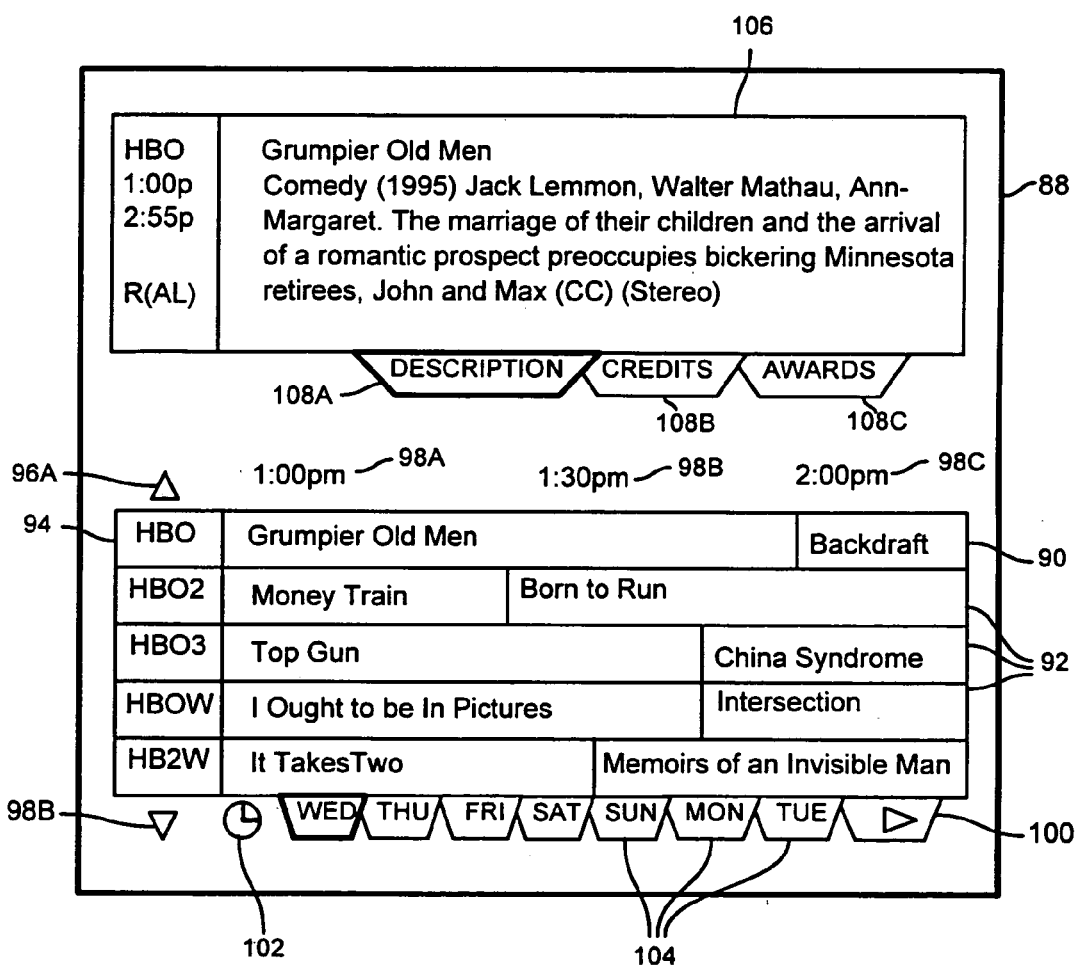
FIG. 4 is a diagram of a preferred embodiment of an electronic television program guide.

FIG. 4 is a diagram of the electronic television program guide 88. The program guide 88 is displayed on a television, and provides information about the timing and content of various television programs. The program guide 88 may alternatively be displayed on other types of display devices, such as on a liquid crystal display (LCD) panel. Additionally, alternate embodiments of program guides may be used as part of the system.

The program guide 88 includes a grid 90, cells 92, a channel list 94, scroll buttons 96A and 96B, time indicators 98A–98C (collectively referred to as time indicators 98), a jump button 100, a time button 102, day indicators 104, an information window 106, and category buttons 108A, 108B and 108C (collectively referred to as category buttons 108). The various buttons and cells are highlighted by navigating around the program guide 88 using remote control 86.

The grid 90 includes a plurality of the cells 92. Each cell 92 includes a program title, and may provide additional information. The channel list 94 includes a list of channel names or channel numbers, or both. The channel list 94 may also include icons, such as icons that represent particular channels. The names and channel numbers for each entry in the channel list 94 are obtained from the channel object for that entry. The time indicators 98A, 98B and 98C (referred to collectively as "time indicators 98") indicate start and end times of the various programs displayed in the grid 90. Although half-hour time blocks (a time block is the length of time between two time indicators 98) are shown in the program guide 88, other time block lengths may be used instead. Scroll buttons 96A and 96B allow users to scroll up and down the channel list 94 and to display different channels. Day indicators 104 indicate the day for which program information is presently being displayed. In FIG. 4, the day indicators 104 indicate that the displayed guide information is for Wednesday. The jump button 100 allows users to skip to program information for a different day than that presently being displayed. The time button 102 allows users to skip to program information for a different time than that presently being displayed.

The information window 106 provides additional information about programs displayed in the grid 90. The type of information displayed in the information window 106 depends on which category button 108A–108C is currently selected. Users select one of the category buttons 108A–108C using the remote control 86. As shown in FIG. 4, the "Description" category is selected. Therefore, when a particular program is selected from the grid 90 by the remote control 86, a description of that program is displayed in the information window 106. In FIG. 4, the program "Grumpier Old Men" was selected from the grid 90, so a description of that program is displayed in the information window 106. Similarly, if the category button 108B or 108C was selected, credits information or awards information, respectively, for "Grumpier Old Men" would be displayed in the information window 106. Other types of category buttons 108 may also be used to display additional categories of information.

The program guide 88 preferably includes schedule information for numerous channels, including DSS channels, ATSC channels and NTSC channels, regardless of whether the channel content is actually transmitted by the television broadcasting system 20. Program guide 88 preferably includes schedule information for the television content generated by the alternate content source 62.

V. Similarity Matching

Through the use of similarity matching, a user can request that the receiver 64 find television programs in the electronic schedule which are similar to a television program that he or she likes. The user can store these preferred programs in the memory 78 and use the characterizing information particular to these programs to query the receiver 64 for similar programs even after the preferred program has been transmitted.

Figure 5:
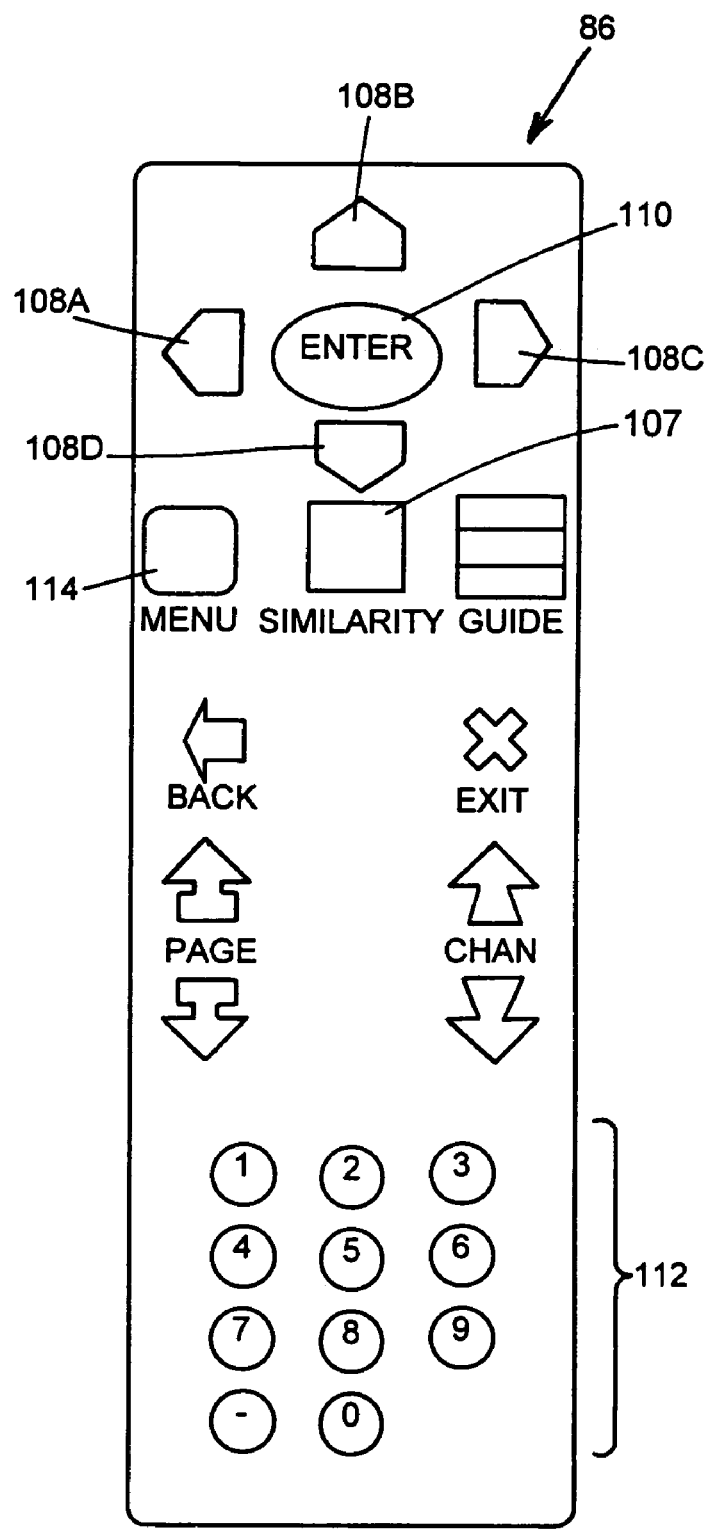
FIG. 5 is a diagram of an embodiment of a remote control.

The first part of similarity matching involves the user selecting one or more program titles from the program guide 88. This usually can be done by navigating around the program guide 88 using the remote control 86 and highlighting the cell 92 containing the preferred program titles. Once the appropriate program title is highlighted, a similarity search is selected using the remote control 86. Although the similarity search can be preformed in many ways, one method would utilize a "similarity" button 107, on the remote control 86. FIG. 5 shows an example of these features on the remote control 86. The remote control 86 includes the navigation buttons 108A–108D, the enter button 110 and the number pad 112. Once the user has highlighted a particular television show by pressing the navigation buttons 108A–108D to position a highlight bar over the desired cell 92, the user can select the similarity option by pressing the similarity button 107. Users can signal the receiver with other input devices such as a keyboard or a mouse in place of remote control 86. Remote control 86 also includes the menu button 114 which allows the user to call-up a menu screen. When the user presses the similarity button 107, the receiver receives a signal through the IR receiver 84 and begins the processing step. An alternate method allows the user to choose the similarity search option through a button displayed on the electronic program guide 88. This step can be accomplished through a menu screen accessed by pushing the menu button 114. For each program that is chosen by a user, the receiver 64 retrieves information characterizing the program. The characterizing information may be included in the program guide objects broadcast to the receiver (as discussed above). When a user selects a program from the program guide 88, the characterizing information from the associated program guide object is retrieved from the memory 78 by the CPU 74.

The characterizing information can be organized into attributes. Attributes include information such as category descriptors that identify the type and category of the program, name descriptors that identify the name of the program selected, credits information that identifies the names and roles of those involved in the production of the program, and key words and phrases in the description of the program. Category descriptors preferably provide a two-tiered category classification, such as "sports/baseball" or "movie/drama," although any number of tiers may be used including single tiers.

Attributes also include indicators that the program is one of a particular series or that the program is one of a group of associated programs. For example, each episode of Star Trek, The Next Generation will have the same series indicator. The Star Trek movies, and various Star Trek series may all have the same group indicator, even if they are not part of one particular series. The CPU 74 keeps track of the program selection made by users, and stores the attributes for selected programs in the memory 78.

The second part of similarity matching involves correlating the characteristics of programs in a television programming schedule with the information compiled regarding the individual user's viewing selections. The receiver 64 uses similarity matching to determine how well television programs from the electronic program guide fit a user's preferred television program attributes stored in the memory

78. The preferred television program is one that the user selects for similarity matching.

As discussed earlier, program guide data are broadcast to the receiver 64 along with television content. Each television program transmitted has associated program objects which are used to create an electronic program guide (discussed above in FIG. 4). These program objects include attributes which are based on characteristics of the associated television program. The receiver 64 determines how well a particular television program from the electronic program guide fits the user's similarity request by comparing its attributes with attributes of the preferred television program. The process of comparing the attributes of the preferred television program to the attributes of the television programs included in the scheduling information is done by the CPU 74 using various algorithms. In these algorithms, different attributes can be given different weights to emphasize some program attributes over other program attributes.

Figure 6:
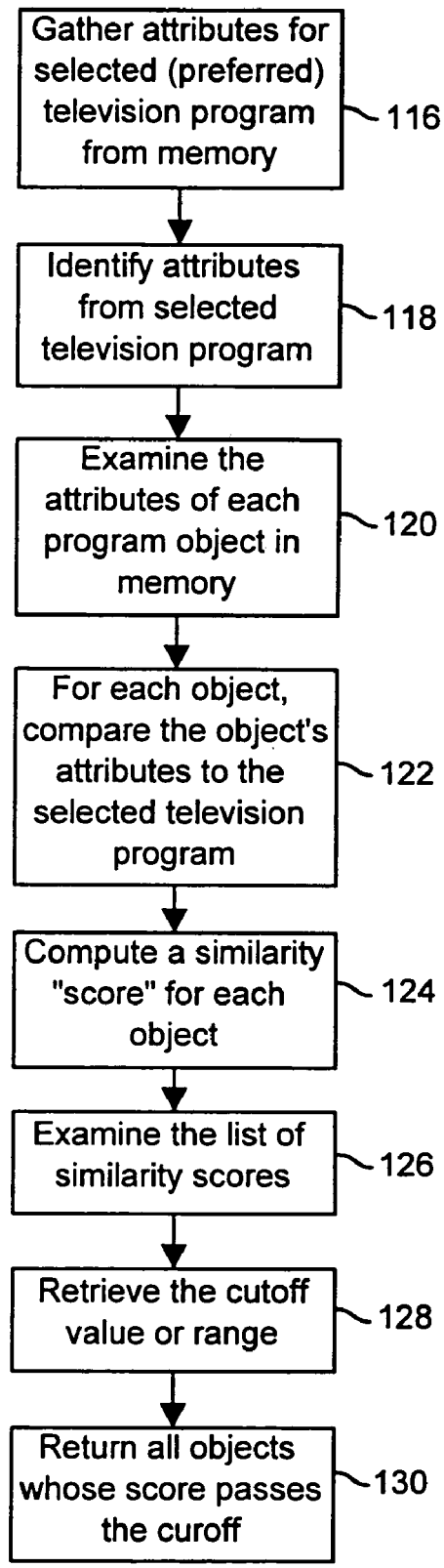
FIG. 6 is a block diagram illustrating similarity matching.

FIG. 6 is a block diagram illustrating an example similarity matching technique. As shown in FIG. 6, the CPU 74 in the receiver 64 accesses the attributes stored in the memory 78 of the selected or preferred television program title (Block 116). The CPU 74 identifies attributes found in the program object associated with the selected program title (Block 118). As mentioned earlier, attributes may include information from category descriptors, name descriptors, credits information, and key words or phrases, etc. The CPU 74 then examines the attributes of programs in the program schedule transmitted in the program guide data (Block 120), and compares these attributes to attributes of the selected television program title to find matching attributes (Block 122). Program objects found in the scheduling information which match any of the attributes of the selected television program have a similarity algorithm applied to them by the CPU 74.

The receiver 64 uses the similarity algorithm to compare schedule television program attributes to the selected television program attributes. The similarity algorithm can be used to weight certain attributes to calculate a similarity score tailored in specific ways (discussed in FIG. 7). The amount of weight given to a particular attribute (e.g., name descriptor) affects the relative similarity scores for the television programs, which can be used to vary the display of the results. For example, the order in which their associated program objects are displayed to the user may vary according to the strength of the similarity score in the electronic program guide. A similarity score is calculated for each of the schedule television programs and is stored in the memory 78 (Block 124).

The third part of similarity matching involves using correlations between the characteristics of schedule program objects and the selected television program to display program titles which are similar in some manner to the selected television program title. One example of using similarity scores to match television programs to an individual user's preferences is to display those television programs from the electronic program guide which have at least a predetermined cutoff similarity score. In order to accomplish this action, the CPU 74 examines the list of calculated similarity scores stored in the memory 78 (Block 126). A "cutoff" value or range is built into the logic 80 in the receiver 64 (Block 128) or may be selected by the user. The receiver 64 compares each score to the "cutoff" similarity score. Only those television programs with program objects that have a similarity score above the cutoff score or range of scores are retained to be displayed in the electronic program guide (Block 130).

To illustrate, assume that the category descriptor is an important attribute required to have acceptable search results from a user similarity request. A similarity algorithm which heavily weights the category descriptor attribute relative to the other attributes will insure that a television program in the same category as the selected program has a relatively high similarity score, even though other attributes associated with the television program may not match the list of common attributes in the user's selection history. So, if the preferred program title is "Monday Night Football" any objects which are classified under the category descriptor "Sports" or "Sports/Football" will receive a high matching score. In this way, the user is likely to see program objects in the electronic program guide which describe television programs that match the category attribute, regardless of how few of the other attributes of the program object match the list of attributes from the preferred television program. Therefore the basketball television program "Timberwolves vs. Spurs" will receive a higher matching score than the television program "All the Right Moves" a movie about high school football. Of course, similarity algorithms may be weighted in any fashion to emphasize some attributes over other attributes.

The cutoff value can be a value which doesn't change. Alternatively, the cutoff value may vary depending on the number of programs which match the selected program. For example, if 100 programs are found which meet the cutoff score, the CPU 74 in the receiver 64 can specify that a higher cutoff score be used to narrow the results from the search. On the other hand, if no programs are found which meet the cutoff score, the CPU 74 can specify that a lower cutoff score be used. If desired, a user may select the cutoff value.

Figure 7:
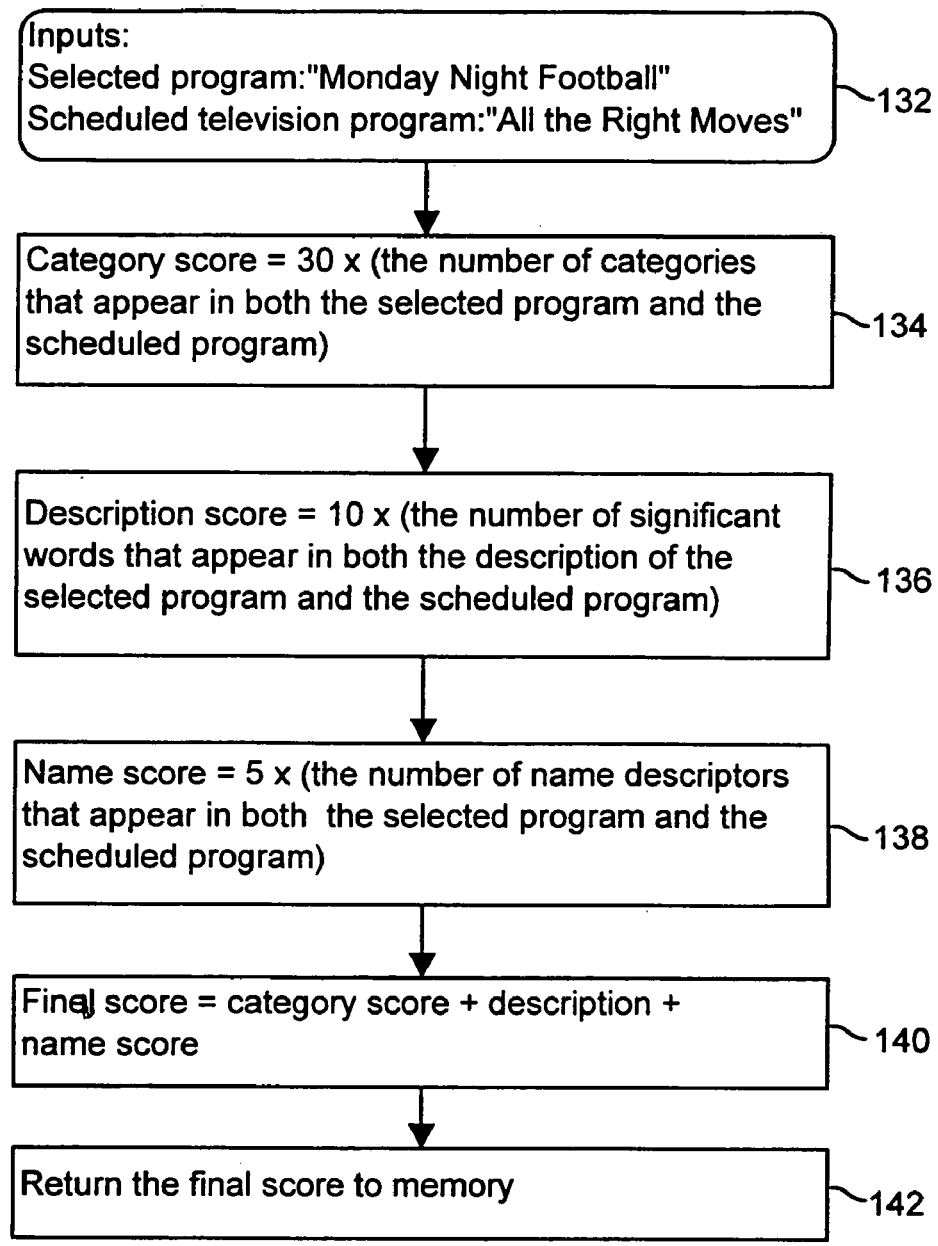
FIG. 7 is a block diagram illustrating an example of a similarity algorithm a receiver uses to perform similarity matching shown in FIG. 6.

The example similarity algorithm explained below with reference to FIG. 7 emphasizes the category descriptor attribute by weighting it three and six times as much as the other attributes examined. In addition, the example similarity algorithm of FIG. 7 is also set up to scale similarity scores so that television programs that match well to a user's selected television program have a score between 100 and 150. Using this algorithm, a similarity score of 100 is used as a predetermined cutoff score to compare the relative similarity scores of television programs. The receiver 64 uses a predetermined score to determine which program objects are to be displayed in the electronic program guide. However, the present invention is not limited to any one particular similarity algorithm, and numerous other algorithms may be used to correlate the attributes of a user's selection history and the attributes of television programs.

In the example similarity algorithm illustrated in FIG. 7, the CPU 74 searches for attributes in the selected television program "Monday Night Football" by examining its associated program object stored in the memory 78. The CPU 74 then examines the attributes in the program object associated with the television program "All the Right Moves," which was transmitted as part of the program guide data and is an upcoming program in the electronic program guide. The attributes from the selected television program are matched against those found in the program object from the television program schedule (the program object associated with a television program to be transmitted in the future) (Block 132). As discussed below, matching attribute types are first weighted and then all the attributes from the program object which match the attributes from the selected television program title are totaled.

Here, the schedule television program has category, description, and name attributes which match the selected (preferred) television program. First, the CPU 74 matches the category descriptor in the selected television program and calculates a score for the category attribute (Block 134). To accomplish this step, the CPU 74 counts the number of category descriptors common to the selected television program and the schedule program object and weights the count by multiplying the count by thirty.

Next, the CPU 74 examines the selected television program and the schedule program object for description field attributes. Specifically, the CPU 74 looks for words common in the description fields to calculate a description score (Block 136). The CPU 74 filters out less significant words such as "and", "is" and "the" in order to determine a more meaningful description score. The CPU 74 counts the number of significant words common to both the selected television program and the schedule program object and weights that number by multiplying the count by ten.

Next, the CPU 74 calculates a name score by examining the name descriptor attributes in both the selected television program and the schedule program objects (Block 138). If the name descriptor matches, the CPU 74 weights the count by multiplying the number of name descriptors that appear in both the selected program and the scheduled program by five.

Finally, the CPU 74 calculates the similarity score for the schedule program object by adding the category score, the description score, and the name score together (Block 140). The calculated score for that schedule program object (and its associated program title) is stored in memory 78 (Block 142) so that the CPU 74 can compare the newly calculated similarity score with similarity scores for other television programs, and later use the calculated similarity scores to select program objects to be displayed in the electronic program guide.

Although similarity matching has been described using a single television program selected by the viewer, other methods of determining which program a user might prefer exist. One alternative method is to allow a viewer the option of saving multiple programs they enjoy in the memory 78. Upon selecting a dedicated button on the remote control, or a link on the display screen, the user can select a "programs I might like" option. The receiver would take attributes from the preferred programs saved in the memory 78 and find attributes which occur most often. For example, by comparing the attributes of ten saved programs, the receiver 64 (through CPU 74) can determine that 80% of the programs contain the category descriptor "sports," 30% contain the category descriptor "football", and 10% contain the word "football" in its description. The receiver 64 can use these percentages to weight attributes in the similarity algorithm (as discussed in FIG. 7). Another alternative in collecting user preference information would be to have the receiver 64 keep track of a user's viewing history. By maintaining a list of programs the user has watched, the receiver 64 can determine common attributes which would indicate to the receiver 64 what types of programs the viewer prefers, even if the viewer is not consciously aware of it herself.

As mentioned earlier, the receiver 64 not only determines which television programs to display in the electronic program guide, but can also determine how to display the similarity matched television programs according to how high a similarity score they have. For example, a television program having a high similarity score could be displayed more prominently over a television program having a low similarity score. This may be accomplished using larger font, colors, underlining, bold font, or any number of additional methods. In this way, users are alerted to television programs in the electronic program guide which are customized to their interests.

The steps discussed for similarity matching include compiling attribute information for the selected television program object and the scheduled program objects, utilizing a similarity algorithm to weight the attributes, and comparing the resulting program object "score" against a cutoff score to determine which scheduled television programs are to be displayed. Next, the receiver returns the results of the similarity search to the user, displaying a results the screen 144. The results screen is created using a similar process used to create of the electronic program guide described in FIG. 4. The receiver 64 combines objects stored in the memory 78 in a manner that creates a display screen. The receiver 64 has a pre-set template for the display screen determines which program objects will be used to fill in areas in the template stored in the receiver. The results screen 144 may be displayed in a number of ways. For example, it may be displayed alone on the television 66, it may overlay the program guide 88, or it may be displayed as a component of the program guide (i.e. in the information window 106). Of course, any number of other methods may also be used.

Figure 8:
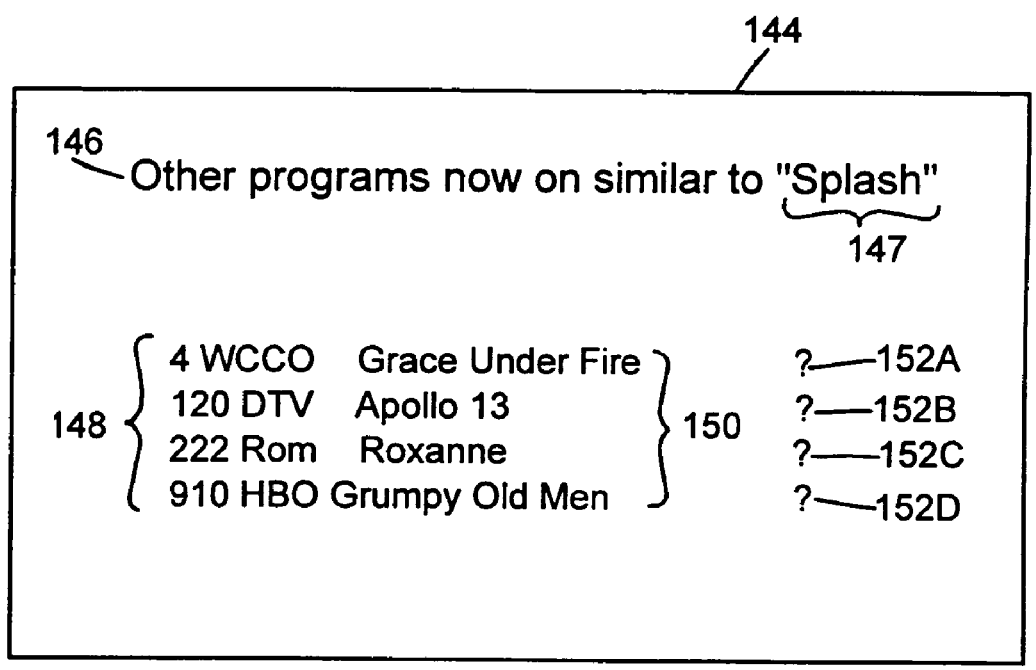
FIG. 8 is an embodiment of a display of similarity matched television programs.

One example of the results screen 144 is shown in FIG. 8. Here, the results screen 144 includes a results title 146, a selected program title 147, transmission channels 148, result program titles 150 and explanation indicators 152A–152D. The results screen 144 is generated by the receiver 64 using a digital image stored in memory 78. The digital image for the results screen 144 contains blank areas where result program titles 150 (as well as other program information) are inserted by the CPU 74. The result program titles 150 are drawn from the program objects obtained through the similarity search discussed above. In this embodiment, explanation indicators 152 are illustrated by the use of a question mark, however, any indicator may be used (i.e. an icon, a word, a picture, etc.). Note that in the following description of FIGS. 8–10, specific examples of display elements such as the explanation indicator 152A are referred to with a reference number that includes an appended letter, in this case the letter "A." On the other hand, when display elements are referred to generally, no letter is appended (e.g. explanation indicator 152) which refers collectively to all of the explanation indicators appearing in the depicted embodiment.

The results title 146 includes a digital image portion which reads "Other programs now on similar to" and the title of the selected program title 147 "Splash." In this example, the user is requesting similarity matches to the movie "Splash." The results of the requested search is shown by the receiver 64 displaying the transmission channels 148 and the results program titles 150 for the television programs whose attributes matched the user selected program title 147 "Splash" according some criteria. The selected program title 147 is a romantic comedy movie about a mermaid. A user looking at the results of the similarity search may be confused by the result program titles 150 which were presented by the receiver 64 as being "similar" to the selected program title 147. The first result program title 150, "Grace Under Fire," is a half-hour situation comedy starring a well known comedienne. The second result program title 150, "Apollo 13," is a movie about an ill-fated NASA manned lunar mission. The third result program title 150, "Roxanne," is a modem movie version of the play "Cyrano de Bergerac." The fourth result program title 150, "Grumpy Old Men," is a movie comedy about two men living in the state of Minnesota. None of the four result program titles 150 seem to have an immediate intuitive connection that would indicate to the user why the receiver would display them as being similar to the selected program title 147. Here, the result program titles 150 are arranged in order according to the transmission channel 148, although any method of ordering may be used. One alternate method would include using the value of the score calculated by the similarity algorithm to arrange the result program titles 150 from most, for example, similar to least similar.

Figure 9A:
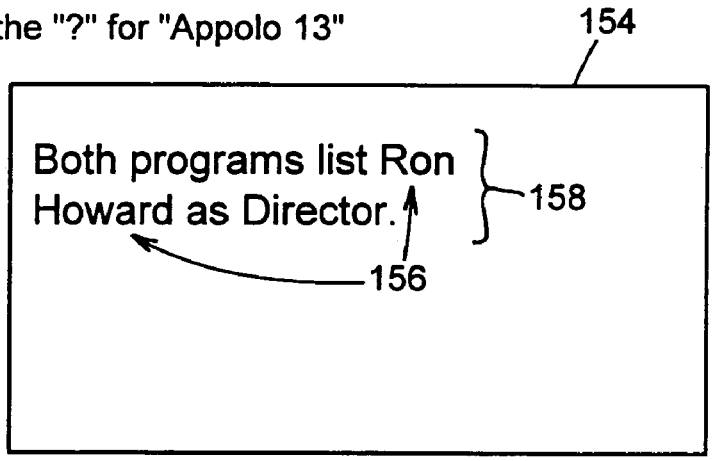
FIG. 9A is an embodiment of a display of an explanation for a similarity matched television program.

The receiver 64 may provide an explanation to the user by displaying the attributes used by the CPU 74 on the television 66, describing why each results program title 150 was matched to the selected program title 147. By selecting the explanation indicator 152A–152D proximate to each result program title 150 (using the remote control as discussed with respect to FIG. 5), the receiver will communicate to the user the attributes used to match the program titles 150 returned from the similarity search, with the selected program title 147. To illustrate, if the user selects explanation indicator 152B, the receiver 64 will generate an explanation screen 154 as shown in FIG. 9A.

Once again, the explanation screen 154 is generated by the receiver 64 using a digital image stored in the memory 78. The explanation screen 154 shown in FIG. 9A includes explanation attribute 156 and explanation 158. Blank areas exist where the explanation attribute 156 is inserted into the explanation 158 by the receiver 64. The explanation 158 is stored as a digital image, and the explanation attribute 156 (in this case "Ron Howard") is inserted into a blank area in the explanation 158. Similar to the results screen 144, the explanation screen may be displayed in any number of ways. For example, it may be displayed alone on the television 66, it may overlay the program guide 88, or it may be displayed as a component of the program guide (i.e., in the information window 106), as well as any one of a number of other methods.

To determine what the explanation screen 154 is to display to the user, the receiver 64 examines which attributes contained in the result program title 150 "Apollo 13" match attributes contained in the selected program title 147 "Splash." In this example, the receiver 64 determined that the program objects for each of the television programs has the same director attribute. Next, the receiver 64 selects the stored digital image "Both programs list (blank) as Director" and inserts the specific attribute "Ron Howard" in the blank and displays the resulting text on the television 66.

Figure 9B:
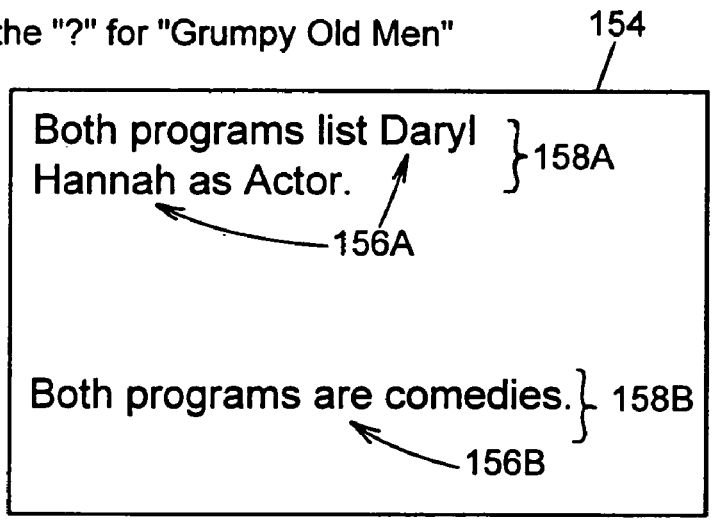
FIG. 9B is an embodiment of a display of an explanation for a similarity matched television program.

Similarly, if the user selected the explanation indicator 152D (from FIG. 8) for the movie "Grumpy Old Men," the explanation screen 154 shown in FIG. 9B would be displayed on television 66 by the receiver 64. In FIG. 9B, two attributes of the result program title 150 match the selected program title 147. A category descriptor attribute and an actor attribute were the same for both television programs. The digital image containing the text for the explanation 158A describing an actor starring in the television program 180 is displayed by the receiver 64, with the explanation attribute 156A "Daryl Hannah" inserted into the text of explanation 158A. This explanation communicates to the user that the actor "Daryl Hannah" stars in both program titles and explains to the user one reason why the television program "Grumpy Old Men" is similar to the television program "Splash." Additionally, a second explanation attribute 156B is displayed by the receiver 64, with the category descriptor "Comedies" inserted into the explanation 158A. This communicates to the user a second reason why the television program "Grumpy Old Men" is similar to the television program "Splash," because (as the explanation 158B states) "Both programs are comedies." The same format shown in FIGS. 9A–9B can be used to explain the remaining program titles 150 by selecting explanation indicator 152A (showing the matching category attribute "Comedies") and explanation indicator 152C (showing the matching category attribute "Comedies" and the matching actor attribute "Daryl Hannah"). Although FIG. 9B shows two explanations 158A and 158B on the same explanation screen, any number of ways may be used to show that multiple attributes of the program title 150 and the selected program title 147 match. One alternative method would be to place the multiple explanation indicators 152 next to each result program title 150 that has more than one matching attribute. Using this method, each explanation indicator 152 selected would result in only a single matching attribute being explained. In order to see all the attributes of the selected television program 147 and the program title 150 which matched, all of the explanation indicators 152 would have to be selected.

Figure 10:
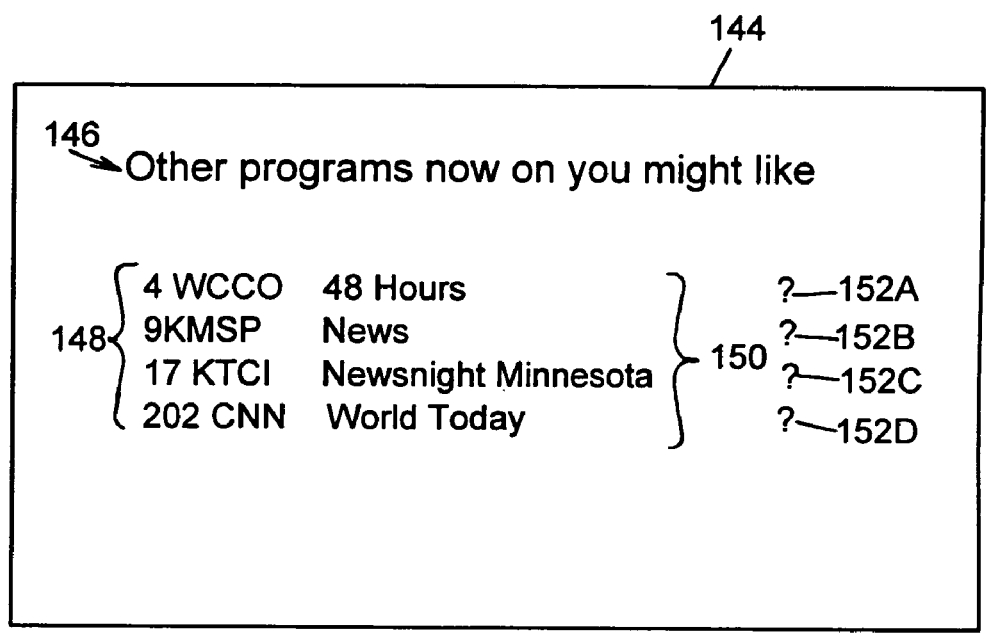
FIG. 10 is an embodiment of a display of similarity matched television programs.

An alternate embodiment of the results screen 144B is shown in FIG. 10. In FIG. 10, similarity matching was performed using a list of saved preferred programs or a user selection history list (described previously). The results title 146 refers generally to programs the user might like as opposed to comparing one specific television program chosen by the user. The results screen 144 shows the transmission channels 148 and result program titles 150 of programs which have attributes matching a list of attributes generated by the receiver reflecting the user's preferences. The results title 146 contains the text "Other programs now on you might like." Although both FIG. 8 and FIG. 10 have results titles which specify programs currently being transmitted, this by no means limits the similar titles which may be displayed to programs which are currently being transmitted. The receiver 64 can search for matching attributes in program objects that will be transmitted in any time frame (i.e. next hour, today, this week, this month, etc.) after the user selects one of the explanation indicators 152 (for example, indicator 152A), the explanation screen 154 shown in FIG. 11 is generated and is displayed by the receiver 64 on the television 66.

FIG. 11 illustrates an alternate method of displaying why certain program titles were displayed as being similar. The explanation 158 contains a preference indicator 160 which is inserted into the digital image. It is also possible for the receiver 64 to calculate the percentage of common attributes (discussed previously) which are contained in a list of saved preferred television programs or a user selection history list. The receiver 64 through the CPU 74 can assign words to these percentages (or ranges of percentages) to more clearly or intuitively express the results. The word "most" is inserted in the explanation 158 as the preference indicator 160. This can communicate that in a list of saved user programs, 80–99% contain the categorical attribute 156 "News." To continue the example, the receiver can use the words "all" for 100%, "many" for 40–80% and "some" for 0–40%. Of course, any other words which effectively communicate an amount or, alternatively, the actual percentages themselves may be used in the explanation 158. Although in this embodiment, all the explanation indicators 152A–152D in FIG. 10 would result in the explanation shown in FIG. 11, it is possible to have multiple explanations which specify different common attributes. For example, if 20% of a list of saved user programs contain the category attribute "comedies," then selecting the explanation indicator 152 for one of the displayed result program titles 150 would cause receiver 64 (through CPU 74) to the display the results screen 144 on the television 66 as shown in FIG. 12.

In FIG. 12, the preference indicator 160 "some" is used in the explanation 158 to indicate to the user that there was not a high-level of similarity between the result program title 150 displayed and the list of saved user programs. The explanation attribute 156 "Comedies" is inserted in the digital image of the explanation 158. Displaying the explanation 158 in this fashion, effectively communicates to the user the reason why the result program title 150 was similarity matched to his or her list of preferred television programs. The user also will realize that the similarity was either not high (as in FIG. 12) or quite high (as in FIG. 11) and allows the user to make further judgments as to whether he wishes to view the matched program.

By providing matching information to the user, the invention gives the user a more complete understanding of the viewing options available to him or her. This is done using the receiver 64 to store program information and user preferences in the memory 78. The CPU 74 searches through these information and preferences to determine television programs from the program schedule which match the preferences of the user. The user can request that the receiver 64 display the explanation 158 to indicate why CPU 74 matched particular television programs, by requesting that the CPU 74 display matching attributes. These attributes are displayed by the receiver 64 in an understandable intuitive fashion. Providing the user with the matching information better enables the user to navigate through a large amount of television schedule information and to find programming that suits his or her preferences.

Although the present invention has been described with reference to preferred embodiments, workers skilled in the art will recognize that changes may be made in form and detail without departing from the spirit and scope of the invention.

What is claimed is:

1. A program similarity detecting device comprising:
    a receiver adapted to receive an input stream of television program content and electronic program guide data, and adapted to separate the electronic program guide data from the input stream, wherein the program guide data includes a plurality of attributes characterizing television programs within the television program content;
    a memory coupled to the receiver and adapted to store the electronic program guide data;
    a controller coupled to the memory; and
    a display coupled to the controller;
    wherein the controller is programmed to compare a first set of attributes relating to at least one television program within the television program content to a second set of attributes relating to a second television program within the television program content to calculate a similarity score for the second television program based on a weighted combination of at least two attributes from the second set of attributes, and wherein the controller is programmed to cause the display to generate a first display indicating the second television program based on the similarity score.

2. The device of claim 1, wherein the controller is programmed to cause the display to generate a second display including an explanation describing the similarity score.

3. The device of claim 2, wherein the explanation includes a textual description of the attributes used by the controller when calculating the similarity score.

4. The device of claim 1, wherein the plurality of attributes characterizing television programs within the television program content include category information and wherein the controller is programmed to compare category information associated with the first television program to category information associated with the second television program to calculate the similarity score.

5. The device of claim 1, wherein the plurality of attributes characterizing television programs within the television program content include keywords and phrases and wherein the controller is programmed to compare keywords and phrases associated with the first television program to keywords and phrases associated with the second television program to calculate the similarity score.

6. The device of claim 1, wherein the plurality of attributes characterizing television programs within the television program content include series information and wherein the controller is programmed to compare series information associated with the first television program to series information associated with the second television program to calculate the similarity score.

7. The device of claim 1, wherein the plurality of attributes characterizing television programs within the television program content include group information and wherein the controller is programmed to compare group information associated with the first television program to group information associated with the second television program to calculate the similarity score.

8. The device of claim 1, wherein the plurality of attributes characterizing television programs within the television program content include credits information and wherein the controller is programmed to compare credits information associated with the first television program to credits information associated with the second television program to calculate the similarity score.

9. The device of claim 1, wherein the plurality of attributes characterizing television programs within the television program content include name information and wherein the controller is programmed to compare name information associated with the first television program to name information associated with the second television program to calculate the similarity score.

10. The device of claim 1, wherein the controller is programmed to calculate a similarity score for each of a plurality of the television programs included in the television program content by comparing the first set of attributes and a further set of attributes associated with each of the plurality of television programs.

11. The device of claim 10, wherein the memory stores a cutoff score and wherein the controller is programmed to compare the similarity scores to the cutoff score and to limit the number of indications of television programs displayed on the display using the cutoff score.

12. A method of identifying similar programs within a video reception system comprising:
    storing first characterizing information associated with a first television program;
    receiving further characterizing information associated with each of a second set of television programs;
    comparing the first characterizing information and each of the further characterizing information to determine a similarity score for each of the second set of television programs, wherein each similarity score is calculated based on a weighted combination of attributes associated with a corresponding one of the programs from the second set television programs;

selecting a third set of television programs from the second set of television programs based on the similarity scores; and displaying indications of the third set of television programs.

13. The method of claim 12, further comprising displaying an explanation of the similarity score for at least one of the third set of programs.

14. The method of claim 13, wherein displaying the explanation further comprises the stop of displaying an attribute associated with the further characterizing information that matches an attribute associated with the first characterizing information.

15. The method of claim 13, wherein displaying the explanation further comprises displaying the explanation textually.

16. The method of claim 12, wherein the attributes include category information.

17. The method of claim 12, wherein the attributes include keywords and phrases.

18. The method of claim 12, wherein the attributes include series information.

19. The method of claim 12, wherein the attributes include group information.

20. The method of claim 12, wherein the attributes include credits information.

21. The method of claim 12, wherein the attributes include name information.

22. A method of displaying program similarity explanations comprising the steps of:

receiving program guide data including characterizing information for each of a plurality of television programs;

storing the program guide data in a memory;

identifying a first set of television programs;

storing attribute information for the first set of television programs;

comparing the characterizing information of the first set of television programs with attribute information for a second set television programs;

calculating a similarity score for each of the second set of television programs, wherein each of the similarity scores is based on a weighted combination of attributes associated with the second set of television programs that match attributes associated with the first set of television programs; and displaying an indication of at least one of the television programs within the second set of television programs based on the similarity scores.

23. The method of claim 22, wherein the step of displaying the indication includes displaying an explanation of a correlation between the first set of television programs and one of the television programs within the second set of television programs.

24. The method of claim 22, wherein the first set of television programs includes one television program.

* * * * *